(12) United States Patent
Lund (10) Patent No.: US 12,485,734 B2
(45) Date of Patent: *Dec. 2, 2025

(54) SAFETY RELEASE SYSTEM, A SIDE IMPACT RESTRAINT PROTECTION SYSTEM, AND A METHOD FOR OPERATING A SAFETY RELEASE SYSTEM

(71) Applicants: Ningbo Geely Automobile Research & Development Co., Ltd., Ningbo (CN); Zhejiang Geely Holding Group Co., Ltd., Zhejiang (CN)

(72) Inventor: Kjell-Åke Lund, Mölnlycke (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 271 days.

This patent is subject to a terminal disclaimer.

(21) Appl. No.: 18/201,834

(22) Filed: May 25, 2023

(65) Prior Publication Data

US 2023/0294490 A1 Sep. 21, 2023

Related U.S. Application Data

(63) Continuation of application No. PCT/CN2021/135281, filed on Dec. 3, 2021.

(30) Foreign Application Priority Data

Dec. 14, 2020 (EP) .................................... 20213796

(51) Int. Cl.
*B60J 5/04* (2006.01)
*B60R 21/00* (2006.01)

(52) U.S. Cl.
CPC .......... *B60J 5/0437* (2013.01); *B60J 5/0459* (2013.01); *B60R 2021/0027* (2013.01)

(58) Field of Classification Search
CPC ...... B60J 5/0437; B60J 5/0459; B60J 5/0425; B60J 5/044; B60J 5/0447; B60J 5/0479;
(Continued)

(56) References Cited

U.S. PATENT DOCUMENTS 3,395,892 A 8/1968 Ratcliff
3,887,227 A 6/1975 Deckert
(Continued)

FOREIGN PATENT DOCUMENTS

CN 1958347 A 5/2007
CN 101695916 A 4/2010
(Continued)

OTHER PUBLICATIONS

Translation DE 102021004411, 2022.*
(Continued)

*Primary Examiner* — Joseph D. Pape
*Assistant Examiner* — Denise Lynne Esquivel
(74) *Attorney, Agent, or Firm* — Tucker Ellis LLP (57) ABSTRACT

A safety release system releases a connection between a side safety structure and a connecting device of a side impact restraint protection system for a vehicle after an impact event. The side safety structure is connected to a side door, and the safety release system enables opening of the side door after the impact event, wherein the safety release system is arranged between the side safety structure and the connecting device. The connecting device releasably attaches the side safety structure to a side impact restraint protection system member connected to a vehicle body structure. The safety release system includes a releasing mechanism and a releasing member detachable from each other, and the safety release system has a first state where the releasing mechanism and the releasing member are connected to each other and a second state where the releasing (Continued)

mechanism and the releasing member are disconnected from each other.

17 Claims, 8 Drawing Sheets

(58) Field of Classification Search
CPC ...... B60J 5/0456; B60J 5/0458; B60J 5/0445; B60R 2021/0027; B60R 2021/0006; B60R 21/00; B60R 21/0136; B62D 25/04
USPC .......................................... 296/146.6, 187.12
See application file for complete search history.

(56) References Cited

U.S. PATENT DOCUMENTS

| | | | |
|---|---|---|---|
| 5,221,121 A | 6/1993 | Zichner | |
| 5,431,476 A | 7/1995 | Torigaki | |
| 6,332,641 B1 | 12/2001 | Okana | |
| 2010/0181410 A1 | 7/2010 | Ting | |

FOREIGN PATENT DOCUMENTS

| | | | | |
|---|---|---|---|---|
| CN | 102582551 A | | 7/2012 | |
| CN | 203485864 U | | 3/2014 | |
| DE | 19828444 A1 | | 12/1999 | |
| DE | 102014201527 A1 | | 7/2015 | |
| DE | 102021004411 A1 | * | 1/2022 | |
| EP | 2818347 A1 | | 12/2014 | |
| FR | 2207039 A1 | | 6/1974 | |
| FR | 2938484 A1 | | 5/2010 | |
| GB | 2289308 A | | 11/1995 | |
| GB | 2579384 A | * | 6/2020 | ............... B60J 5/00 |
| JP | H05201299 A | | 8/1993 | |
| WO | 9961209 A1 | | 12/1999 | |
| WO | 2020109493 A1 | | 6/2020 | |

OTHER PUBLICATIONS

International Search Report from corresponding International Application No. PCT/CN2021/135281, mailed on Mar. 9, 2022, 2 pages.

* cited by examiner

SAFETY RELEASE SYSTEM, A SIDE IMPACT RESTRAINT PROTECTION SYSTEM, AND A METHOD FOR OPERATING A SAFETY RELEASE SYSTEM

RELATED APPLICATION DATA

This application is a continuation of International Patent Application No. PCT/CN2021/135281, filed Dec. 3, 2021, which claims the benefit of European Patent Application No. 20213796.4, filed Dec. 14, 2020, the disclosures of which are incorporated herein by reference in their entireties.

TECHNICAL FIELD

The present disclosure relates to a safety release system for releasing a connection between a side safety structure and a connecting device of a side impact restraint protection system for a vehicle. The disclosure further relates to a side impact restraint protection system for a vehicle where the side impact restraint protection system comprises the safety release system, and a method for operating the safety release system.

BACKGROUND

Side impact systems are commonly used in vehicle constructions. Door beam constructions arranged in the side doors of the vehicle are used to protect the occupants of the vehicle in a side impact event. The door beams are sometimes configured to cooperate with the A-pillar, B-pillar, and the C-pillar of the vehicle to capture impact energy efficiently. Door beams are due to strength requirements heavy in construction and commonly made of steel. Despite heavy and rigid door constructions, the side doors are not contributing to the strength and stiffness of the vehicle body structure as such, because there is a play with seal members arranged between the doors and the vehicle body structure. Further, many of today's side impact systems will not meet future legal requirements of crash strength, and therefore stronger and heavier door beam constructions are needed, as well as stiffer, stronger and heavier car body constructions. The trend with vehicle body constructions without B-pillars is creating further needs for new side door constructions with increased complexity. After a side impact event, there are sometimes problems with opening the side doors, due to the deformation of the side door structures and the vehicle body structure.

There is thus a need for an improved side impact protection system, which will meet future strength and safety requirements, where the system is lightweight in construction and suitable for different vehicle constructions, as for example vehicle constructions without B-pillars, where the system further is enabling and simplifying opening of the side doors after a side impact event.

SUMMARY

An object of the present disclosure is to provide a safety release system, a side impact restraint protection system, and a method for operating a safety release system where the previously mentioned problems are avoided.

The disclosure concerns a safety release system for releasing a connection between a first side safety structure and a connecting device of a side impact restraint protection system for a vehicle after a vehicle impact event. The first side safety structure is arranged in connection to a first side door of the vehicle, and the safety release system is configured for enabling opening of the first side door after the vehicle impact event. The safety release system is arranged between the first side safety structure and the connecting device, and the connecting device is configured for releasably attaching the first side safety structure to a side impact restraint protection system member connected to a vehicle body structure. The safety release system comprises a releasing mechanism and a releasing member detachable from each other. The safety release system is configured for being arranged in a first state where the releasing mechanism and the releasing member are connected to each other and a second state where the releasing mechanism and the releasing member are disconnected from each other.

Advantages with these features are that with the safety release system, opening of the side doors after a side impact event is enabled and simplified. Through the detachable arrangement of the releasing mechanism and the releasing member from each other, the side doors can be opened without using the traditional door handles and door opening mechanisms. By changing the safety release system from the first state where the releasing mechanism and the releasing member are connected, to the second state where the releasing mechanism and the releasing member are disconnected from each other, opening of the side doors is enabled. The construction with the side impact restraint protection system member connected to a vehicle body structure is providing a strong and safe design of the system suitable for meeting future legal requirements for crash strength, capturing impact energy efficiently. The side impact restraint protection system with this design can be made lightweight in construction and suitable for different vehicle constructions, as for example vehicle constructions without B-pillars.

According to an aspect of the disclosure, the releasing mechanism comprises a hook member and the releasing member comprises a hook receiving opening. The hook member is configured for being engaged with the hook receiving opening in the first state and configured for being disengaged from the hook receiving opening in the second state. The hook member and the hook receiving opening are efficiently cooperating for disengaging the connection of the releasing mechanism after the vehicle impact event.

According to another aspect of the disclosure, the hook member is configured for pivoting from an engaged position in the first state to a disengaged position in the second state. The pivoting function is suitable for a secure disengagement of the hook member from the hook receiving opening.

According to an aspect of the disclosure, the hook member is pivotally displaceable by one or more springs. The hook member is pre-tensioned with the one or more springs in the first state and the one or more springs are configured for displacing the hook member from the engaged position to the disengaged position in the second state. Alternatively, the hook member is pivotally displaceable by an electric motor and the electric motor is configured for displacing the hook member from the engaged position to the disengaged position in the second state. The one or more springs are providing a suitable solution for the disengagement of the hook member, without the need for electricity. The electric motor can be used as an alternative design solution, and a backup electricity system may be used for securing power to the electric motor.

According to another aspect of the disclosure, the releasing mechanism comprises a safety pin configured for preventing displacement of the hook member from the engaged position to the disengaged position in the first state. The safety pin is configured for allowing displacement of the hook member from the engaged position to the disengaged position in the second state. The safety pin is securing unintended or unwanted displacement of the hook member from the engaged position to the disengaged position.

According to a further aspect of the disclosure, the releasing mechanism comprises a first wall structure and a second wall structure. The hook member is pivotally connected to and extending between the first wall structure and the second wall structure. The hook member is configured to pivot around a hook rotational axis when the safety release system is displaced from the first state to the second state. The wall structures and the pivotal connection with the hook member is allowing the pivoting movement of the hook member from the engaged position to the disengaged position.

According to an aspect of the disclosure, the first wall structure comprises a first safety pin track and the second wall structure comprises a second safety pin track. The safety pin is movably connected to and extending between the first wall structure and the second wall structure. The safety pin is configured to move in relation to the first wall structure in the first safety pin track and in relation to the second wall structure in the second safety pin track from a locked position in the first state where the safety pin is blocking movement of the hook member to an unlocked position in the second state where the safety pin is allowing movement of the hook member from the engaged position to the disengaged position. The safety pin tracks are used for guiding the movement of the safety pin from the position in the first state to the unlocked position in the second state, allowing the disengagement of the hook member from the hook receiving opening.

According to another aspect of the disclosure, the releasing mechanism comprises an actuating unit connected to the safety pin. The actuating unit is configured for displacing the safety pin from the locked position to the unlocked position in the second state. The actuating unit is providing an efficient way to move the locking pin to the unlocked position, which in turn is allowing the movement of the hook member.

According to a further aspect of the disclosure, the side impact restraint protection system member is a second side safety structure arranged in connection to a second side door of the vehicle. The safety release system is configured for enabling opening of the first side door and/or the second vehicle door after the vehicle impact event. The two side safety structures are arranged for interacting with each other for taking up side impact forces in a vehicle impact event, and the safety release system is enabling opening of the side doors.

According to an aspect of the disclosure, the first side safety structure is in a first end releasably connected to a first connection member of the vehicle body structure and in a second end connected to the connecting device via the safety release system. The second side safety structure is in a first end connected to the connecting device and in a second end releasably connected to a second connection member of the vehicle body structure. These connections are providing an efficient energy absorbing structure preventing occupants of the vehicle in a side impact event. The safety release system can be efficiently operated in order to open the side doors.

According to another aspect of the disclosure, the first connection member is arranged in connection to an A-pillar of the vehicle body structure, and the second connection member is arranged in connection to a C-pillar of the vehicle body structure. The connections to the A-pillar and the C-pillar respectively are providing a strong and robust construction of the side impact restraint protection system.

The disclosure further concerns a side impact restraint protection system for a vehicle, where the side impact restraint system comprises the safety release system described above.

The disclosure further concerns a method for operating a safety release system of a vehicle. A first side safety structure of a side impact restraint protection system is arranged in connection to a first side door of the vehicle. The safety release system is arranged between the first side safety structure and a connecting device. The connecting device is releasably attaching the first side safety structure to a side impact restraint system protection member connected to a vehicle body structure. The safety release system comprises a releasing mechanism and a releasing member detachable from each other. The safety release system is during normal operation of the vehicle arranged in a first state where the releasing mechanism and the releasing member are connected to each other. The method comprises the steps: arranging the safety release system in a second state after a vehicle impact event, where in the second state the releasing mechanism and the releasing member are disconnected from each other for releasing the connection between the first side safety structure and the connecting device, enabling opening of the first side door.

Advantages with this method are that with the safety release system, opening of the side doors after a side impact event is enabled and simplified. Through the detachable arrangement of the releasing mechanism and the releasing member from each other, the side doors can be opened without using the traditional door handles and door opening mechanisms. The construction with the side impact restraint protection system member connected to a vehicle body structure is providing a strong and safe design of the system suitable for meeting future legal requirements for crash strength, capturing impact energy efficiently. The side impact restraint protecting system with this design can be made lightweight in construction and suitable for different vehicle constructions, as for example vehicle constructions without B-pillars.

According to an aspect of the disclosure, the releasing mechanism comprises a hook member and the releasing member comprises a hook receiving opening. The hook member is engaged with the hook receiving opening in the first state. The method further comprises the step: disengaging the hook member from the hook receiving opening in the second state. The hook member and the hook receiving opening are with this step efficiently cooperating for disconnecting the releasing mechanism after the vehicle impact event, where the hook member is allowed to be disengaged from the hook receiving opening in an efficient way.

According to another aspect of the disclosure, the hook member is pivotally displaceable by one or more springs. The hook member is pre-tensioned with the one or more springs in the first state. The method further comprises the steps: pivoting the hook member from an engaged position in the first state to a disengaged position in the second state, where the one or more springs are displacing the hook member from the engaged position to the disengaged position in the second state. Alternatively, the hook member is pivotally displaceable by an electric motor. The method further comprises the steps: pivoting the hook member from an engaged position in the first state to a disengaged position in the second state, where the electric motor is displacing the hook member from the engaged position to the disengaged position in the second state. The one or more springs are providing a suitable solution for the disengagement of the hook member, without the need for electricity. The electric motor can be used as an alternative design solution, and a backup electricity system may be used for securing power to the electric motor.

According to a further aspect of the disclosure, the releasing mechanism comprises a safety pin preventing displacement of the hook member from the engaged position to the disengaged position in the first state and allowing displacement of the hook member from the engaged position to the disengaged position in the second state. The safety pin is arranged in a locked position in the first state for blocking movement of the hook member. The method further comprises the steps: moving the safety pin from the locked position to an unlocked position in the second state for allowing movement of the hook member from the engaged position to the disengaged position. The safety pin is securing unintended or unwanted displacement of the hook member from the engaged position to the disengaged position during normal vehicle use. When the safety pin is moved to the unlocked position after a vehicle impact event, the hook member can be disengaged from the hook receiving opening, allowing opening of the vehicle doors.

According to an aspect of the disclosure, the releasing mechanism comprises an actuating unit connected to the safety pin. The method further comprises the steps: displacing the safety pin with the actuating unit from the locked position to the unlocked position in the second state. The actuating unit is providing an efficient way to move the locking pin to the unlocked position, which in turn is allowing the movement of the hook member for disengagement from the hook receiving opening.

BRIEF DESCRIPTION OF THE DRAWINGS

The disclosure will be described in detail in the following, with reference to the attached drawings, in which.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In vehicles equipped with a side impact restraint protection system, it is of high importance that side doors of the vehicle can be opened after a vehicle impact event. In FIGS. 1A-1C, 2A-2C, 3A-3B, and 4A-4B, a safety release system $S_R$ being part of a side impact restraint protection system S for a vehicle V is schematically illustrated. The safety release system $S_R$ is arranged for releasing a connection between a first side safety structure 1a and a connecting device 6 of the side impact restraint protection system S after a vehicle impact event, and the safety release system $S_R$ is an important safety feature of the side impact restraint protection system S.

Figure 1A:
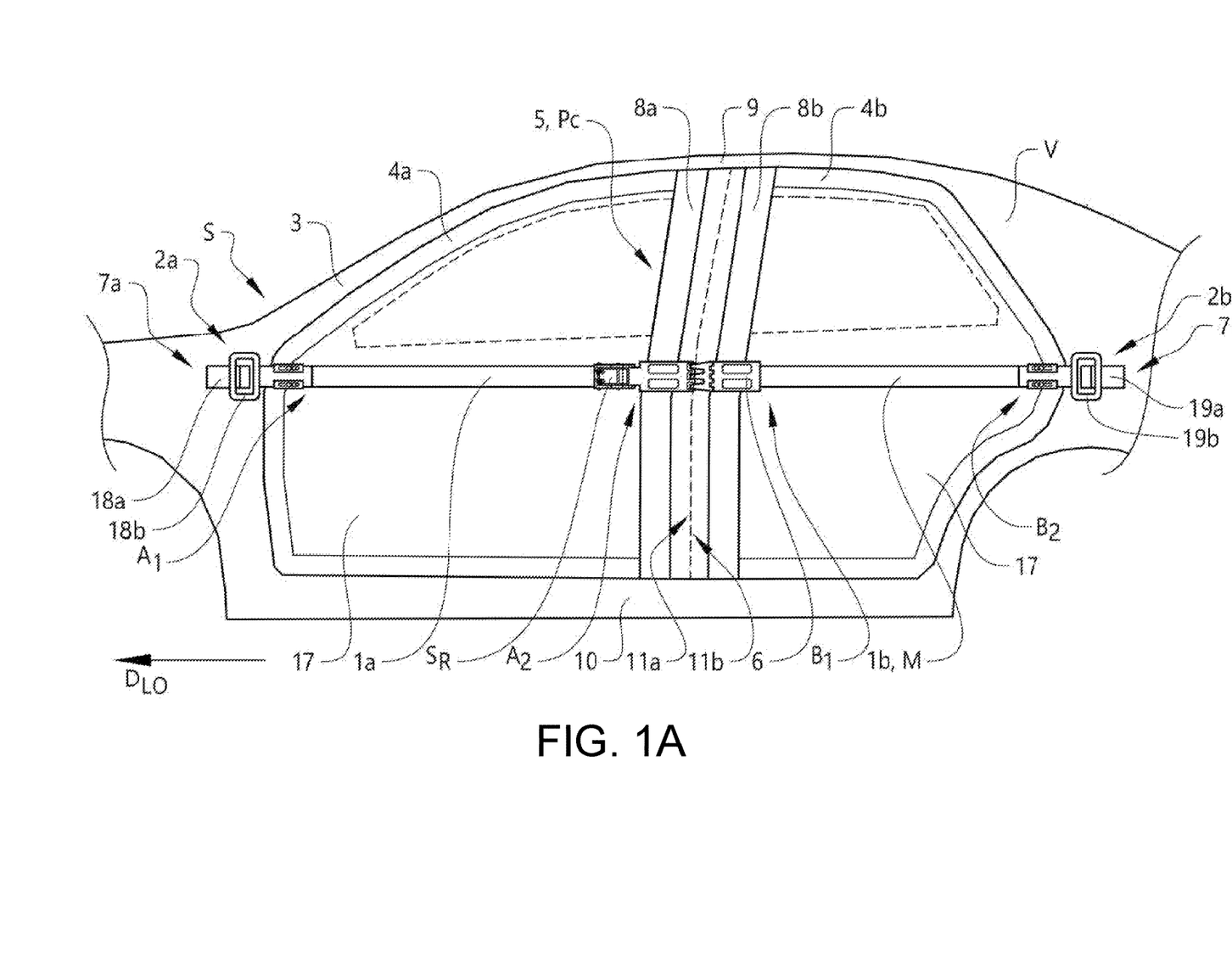
FIGS. 1A-1C show schematically, in side views, embodiments of a side impact restraint protection system with a safety release system, according to the disclosure.

As schematically shown in FIG. 1A, the first side safety structure 1a is arranged in connection to a first side door 4a of the vehicle V. The safety release system $S_R$ is arranged between the first side safety structure 1a and the connecting device 6, and the connecting device 6 is configured for releasably attaching the first side safety structure 1a to a side impact restraint protection system member M connected to a vehicle body structure 3. The safety release system $S_R$ comprises a releasing mechanism 100 and a releasing member 101 detachable from each other. The safety release system $S_R$ is configured for being arranged in a first state S1 where the releasing mechanism 100 and the releasing member 101 are connected to each other, as shown in FIGS. 2A-2B and 3A-3B, and a second state S2 where the releasing mechanism 100 and the releasing member 101 are disconnected from each other, as shown in FIGS. 2C and 4A-4B.

The vehicle V is suitably configured with a vehicle control unit for controlling the different functions of the side impact restraint protection system S and the safety release system $S_R$. The control unit may for example be connected to sensors for detecting the vehicle impact event and further connected to parts of the respective systems for determining the functionality and status of components involved. Suitable sensors may be used for the detections and determinations needed. Furthermore, the control unit may also be connected to sensors configured to detect and track vehicles or objects surrounding the vehicle V for predicting the vehicle impact event.

In the following, the safety release system $S_R$ will be described in connection to the embodiments illustrated in FIGS. 1A-1C, 2A-2C, 3A-3B, and 4A-4B, where the side impact restraint protection system member M is a second side safety structure 1b arranged in connection to a second side door 4b of the vehicle V. The illustrated vehicle V is arranged without a B-pillar. The safety release system $S_R$ may however be used in connection to other vehicle constructions. The first side safety structure 1a and the second side safety structure 1b are attached to the vehicle body structure 3, and connected to each other with the connecting device 6. The safety release system $S_R$ is configured for enabling opening of the first side door 4a and/or the second vehicle door 4b after the vehicle impact event.

In alternative non-illustrated embodiments, the side impact restraint protection system member M may be an attachment arrangement for attaching the connecting device 6 directly to the vehicle body structure 3, for example if the vehicle is arranged with only one side door on each vehicle side, such as in two-door or three-door coupe-type vehicles. In further alternative non-illustrated embodiments, where the vehicle instead is arranged with a B-pillar, the side impact restraint protection system member M may be an attachment arrangement for attaching the connecting device 6 to an A-pillar, a B-pillar, and/or a C-pillar of the vehicle body structure 3, for enabling opening of a first side door 4a and/or a second vehicle door 4b separated by a B-pillar.

The first side safety structure 1a may be arranged as a beam structure in the first side door 4a, a flexible strap structure in the first side door 4a, or a membrane structure integrated in the first side door 4a, for example in an outer door panel 17 of the first side door 4a. The second side safety structure 1b may be arranged as a beam structure in the second side door 4b, a flexible strap structure in the second side door 4b, or a membrane structure integrated in the second side door, for example in an outer door panel 17 of the second side door 4b.

The first side safety structure 1a is suitably arranged as a thin flexible structural member, as schematically illustrated in FIGS. 1A-1C, 2A-2C, 3A-3B, and 4A-4B, where the first side safety structure 1a is having a flat strap-like configuration. In the embodiment illustrated in FIG. 1C, the first side safety structure 1a is having a thin membrane configuration. The first side safety structure 1a is for example made of a thin steel band, or alternatively from a thin structural member made of strong composite materials, polymers, or suitable fiber structures. The first side safety structure 1a is thin and lightweight in construction compared to traditional door beams for a compact and weight-saving side door construction. The first side safety structure 1a is suitably movably arranged in relation to the first side door 4a, and the first side safety structure 1a is thus allowed to move in relation to the first side door 4a in a vehicle impact event. The first side door 4a may for example be arranged with an internal channel-like structure, or similar recessed structure, for efficiently holding the first side safety structure 1a in a movable relationship to the first side door 4a. With this configuration, the first side safety structure 1a is acting like a strap preventing deformation of the first side door 4a in a vehicle impact event for protecting occupants of the vehicle V.

The second side safety structure 1b is suitably arranged as a thin flexible structural member, as schematically illustrated in FIGS. 1A-1C, 2A-2C, 3A-3B, and 4A-4B, where the second side safety structure 1b is having a flat strap-like configuration. In the embodiment illustrated in FIG. 1C, the second side safety structure 1c is having a thin membrane configuration. The second side safety structure 1b is for example made of a thin steel band, or alternatively from a thin structural member made of strong composite materials, polymers, or suitable fiber structures. The second side safety structure 1b is thin and lightweight in construction compared to traditional door beams for a compact and weight-saving side door construction. The second side safety structure 1b is suitably movably arranged in relation to the second side door 4b, and the second side safety structure 1b is thus allowed to move in relation to the second side door 4b in a vehicle impact event. The second side door 4b may for example be arranged with an internal channel-like structure, or similar recessed structure, for efficiently holding the second side safety structure 1b in a movable relationship to the second side door 4b. With this configuration, the second side safety structure 1b is acting like a strap preventing deformation of the second side door 4b in a vehicle impact event for protecting occupants of the vehicle V.

Figure 1B:
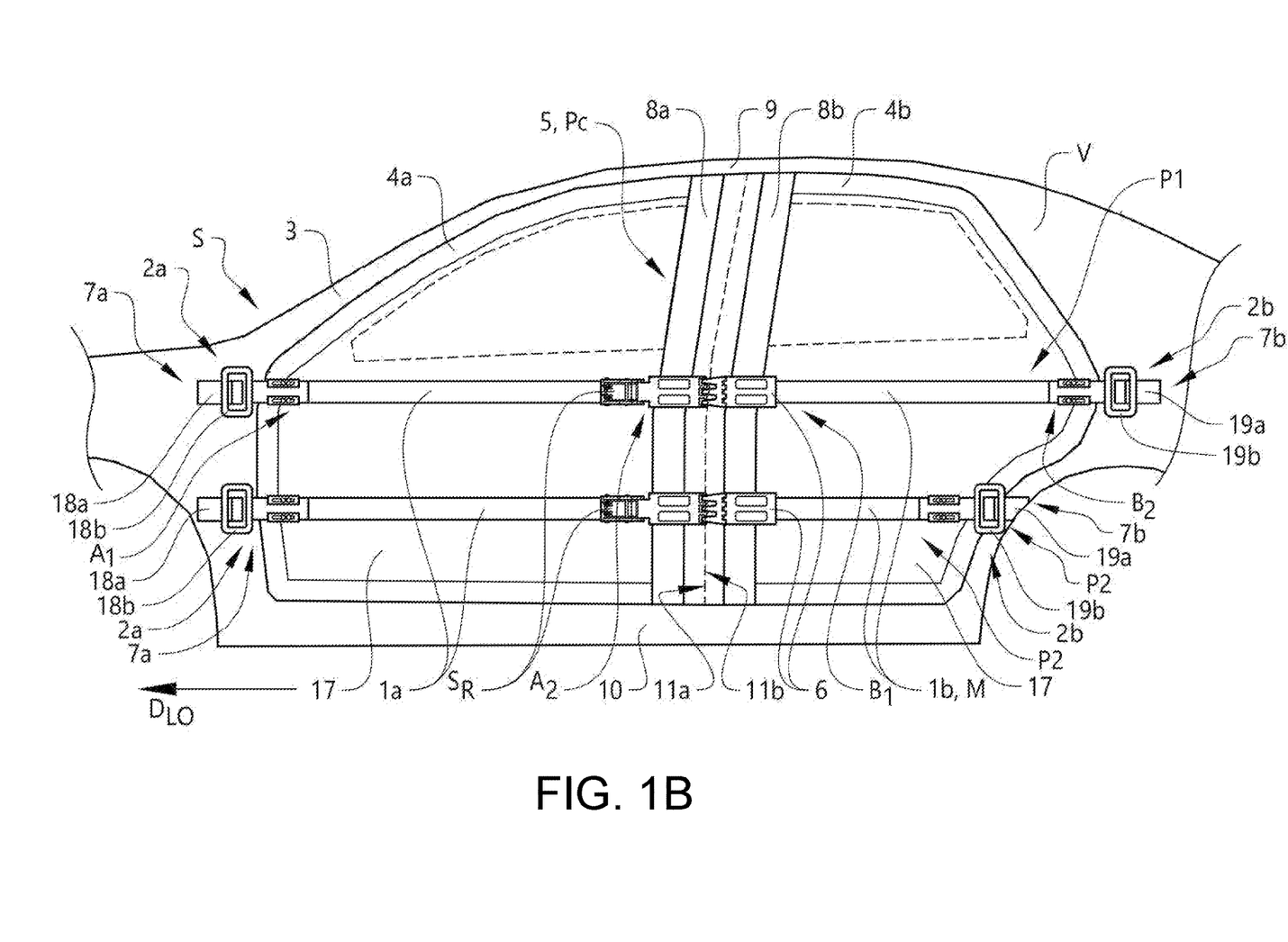
Figure 1C:
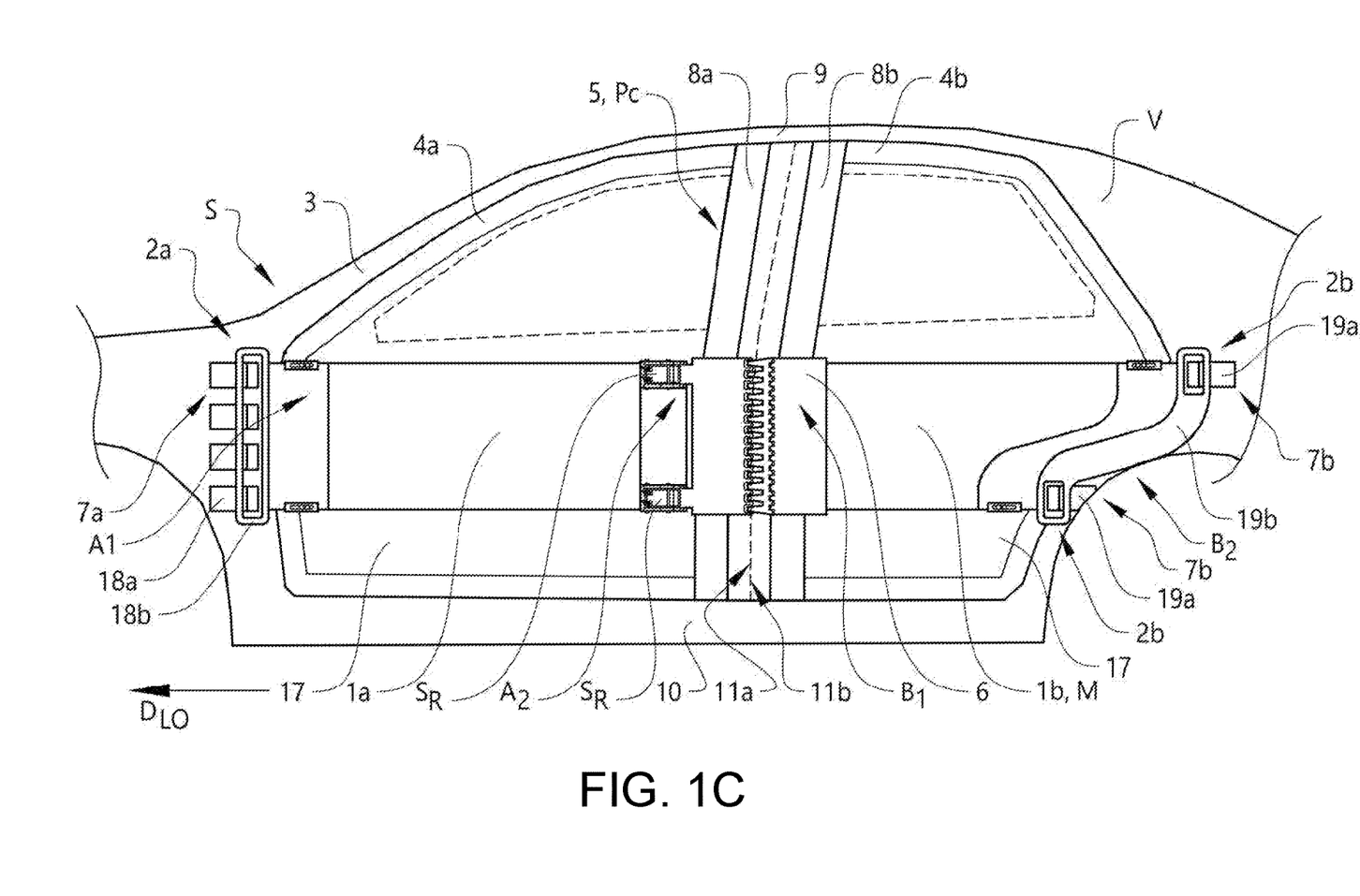

As schematically illustrated in FIGS. 1A-1C, the first side safety structure 1a and the second side safety structure 1b are when connected to each other forming a structure that is extending in the respective side doors from the first structural element 2a of the vehicle body structure 3 to the second structural element 2b of the vehicle body structure 3. In the embodiments illustrated in FIGS. 1A-1C, the side safety structures are together forming a strap-like or membrane-like safety member extending over the door opening 5 for protecting the occupants of the vehicle V in a side impact event. Through the secure connection to the first structural element 2a and the second structural element 2b, the connected first side safety structure 1a and the second side safety structure 1b are cooperating to absorb crash energy in a vehicle impact event. The crash energy is in this way efficiently transferred from the side doors during the vehicle impact event to the respective side safety structures and the vehicle body structure 3 through the secure connection between the first structural element 2a, the first side safety structure 1a, the second side safety structure 1b, and the second structural element 2b. In this way, the side doors are cooperating with the car body structure 3 for absorbing energy.

FIG. 1A schematically shows an embodiment of the side impact restraint protection system S for a vehicle V. The side impact restraint protection system S comprises the first side safety structure 1a, the second side safety structure 1b, a first structural element 2a of a vehicle body structure 3 of the vehicle V, and a second structural element 2b of the vehicle body structure 3. The first side safety structure 1a is arranged in connection to the first side door 4a of the vehicle V and the second side safety structure 1b is arranged in connection to the second side door 4b of the vehicle V. The first side door 4a and the second side door 4b are in the illustrated embodiment arranged to cover a common single door opening 5 of the vehicle body structure 3 in a closed door position $P_C$. As shown in FIG. 1A, the first side door 4a is a front vehicle side door and the second side door 4b is a rear vehicle side door. With this configuration of the vehicle body structure 3, the first side safety structure 2a is an A-pillar and the second side safety structure is a C-pillar. In this way, the first structural element 2a is arranged in a position in front of the door opening 5 in a longitudinal direction $D_{LO}$ of the vehicle V, and the second structural element 2b arranged in a position behind the door opening 5 in the longitudinal direction $D_{LO}$. The common single door opening 5 is arranged without a B-pillar, and the side doors can be opened and closed in relation to the door opening 5 of the vehicle body structure 3 by suitable opening and closing mechanisms.

In the closed door position $P_C$, as illustrated in FIG. 1A, the first side safety structure 1a and the second side safety structure 1b are releasably connected to each other via the connecting device 6. The first side safety structure 1a is connected to the first structural element 2a of the vehicle body structure 3 via a first connection member 7a, and the second side safety structure 1b is connected to the second structural element 2b of the vehicle body structure 3 via a second connection member 7b.

The first side safety structure 1a is in a first end $A_1$ releasably connected to the first structural element 2a via the first connection member 7a, and in a second end $A_2$ connected to the connecting device 6 via the safety release system $S_R$. The second side safety structure 1b is in a first end $B_1$ connected to the connecting device 6 and in a second end $B_2$ releasably connected to the second structural element 2b via the second connection member 7b.

As illustrated in FIG. 1A, the first structural element 2a is arranged forward of the door opening 5 in a longitudinal direction $D_{LO}$ of the vehicle V. The first structural element 2a may be any suitable part of the vehicle body structure 3. In the illustrated embodiments, the first structural element 2a is the A-pillar, or the A-pillar extension, of the vehicle body structure 3. The second structural element 2b is arranged rearward of the door opening 5 in the longitudinal direction $D_{LO}$ of the vehicle V. The second structural element 2b may be any suitable part of the vehicle body structure 3. In the illustrated embodiments, the second structural element 2b is the C-pillar, or the C-pillar extension, of the vehicle body structure 3. As shown in FIG. 1A, the first connection member 7a is arranged in connection to the A-pillar of the vehicle body structure 3, and the second connection member 7b is arranged in connection to the C-pillar of the vehicle body structure 3.

The first connection member 7a may for example be arranged as a first hook structure 18a and a cooperating first opening structure 18b, as schematically shown in FIGS. 1A-1C. The first hook structure 18a is securely attached to the vehicle body structure 3 with suitable fastening means, such as for example screws, rivets or welds. The first opening structure 18b is securely attached to the first side safety structure 1a with suitable attachment means. When the first side door 4a is in the closed door position $P_C$, the first hook structure 18a is engaging the first opening structure 18b for a secure attachment of the first side safety structure 1a to the vehicle body structure 3. When the first side door 4a is opened, the first opening structure 18b may be disengaged from the first hook structure 18a for an efficient opening of the first side door 4a. When the first side door 4a is moved from an open position back to the closed door position $P_C$, the first hook structure 18a is securely engaging the first opening structure 18b.

The second connection member 7b may for example be arranged as a second hook structure 19a and a cooperating second opening structure 19b, as schematically shown in FIGS. 1A-1C. The second hook structure 19a is securely attached to the vehicle body structure 3 with suitable fastening means, such as for example screws, rivets or welds. The second opening structure 19b is securely attached to the second side safety structure 1b with suitable attachment means. When the second side door 4b is in the closed door position $P_C$, the second hook structure 19a is engaging the second opening structure 19b for a secure attachment of the second side safety structure 1b to the vehicle body structure 3. When the second side door 4b is opened, the second opening structure 19b may be disengaged from the second hook structure 19a for an efficient opening of the second side door 4b. When the second side door 4b is moved from an open position back to the closed door position $P_C$, the second hook structure 19a is securely engaging the second opening structure 19b.

The side impact restraint protection system S according to the embodiment illustrated in FIG. 1A comprises a first door beam 8a arranged in the first side door 4a. The first door beam 8a is extending between a roof beam structure 9 and a sill structure 10 of the vehicle body structure 3 when the first side door 4a is arranged in the closed door position $P_C$. The side impact restraint protection system S further comprises a second door beam 8b arranged in the second side door 4b. The second door beam 8b is extending between the roof beam structure 9 and the sill structure 10 of the vehicle body structure 3 when the second side door 4b is arranged in the closed door position $P_C$. The first door beam 8a and the second door beam 8b are configured for replacing the B-pillar of the vehicle body structure 3, allowing a strong structural construction of the vehicle V with the common single door opening 5. The first door beam 8a is arranged in connection to a rear edge 11a of the first side door 4a, and the second door beam 8b is arranged in connection to a front edge 11b of the second side door 4b. The first side safety structure 1a with the connecting device 6 is in a lateral direction $D_{LA}$ of the vehicle V arranged outside of the first door beam 8a, and the second side safety structure 1b with the connecting device 6 is in the lateral direction $D_{LA}$ arranged outside of the second door beam 8b, for a safe construction of the side impact restraint protection system S, as illustrated in FIGS. 1A, 3A and 4A. In an alternative non-illustrated embodiment, the first side safety structure 1a with the connecting device 6 is instead arranged inside of the first door beam 8a in the lateral direction $D_{LA}$ and the second side safety structure 1b with the connecting device 6 inside of the second door beam 8b in the lateral direction $D_{LA}$. In a further non-illustrated embodiment, the first safety structure 1a with the connecting device 6 is extending through the first door beam 8a, and the second side safety structure 1b with the connecting device 6 is extending through the second door beam 8b. It should be understood that instead of two door beams, the door construction could alternatively be arranged with only one door beam arranged in the first side door 4a or the second side door 4b.

Figure 2A:
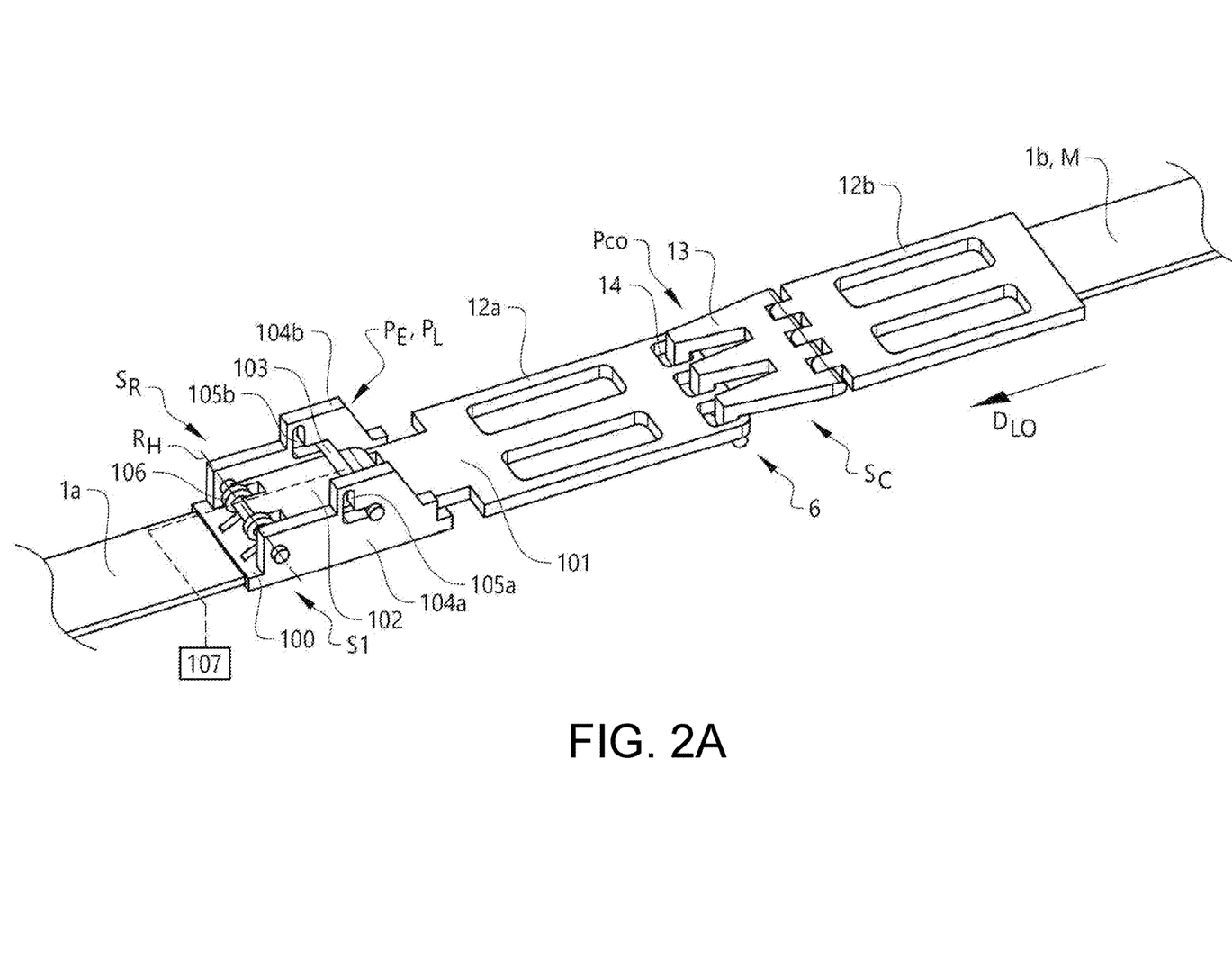
FIGS. 2A-2C show schematically, in perspective views, different operating positions of the safety release system and a connecting device of the side impact restraint protection system, according to the disclosure.
Figure 2B:
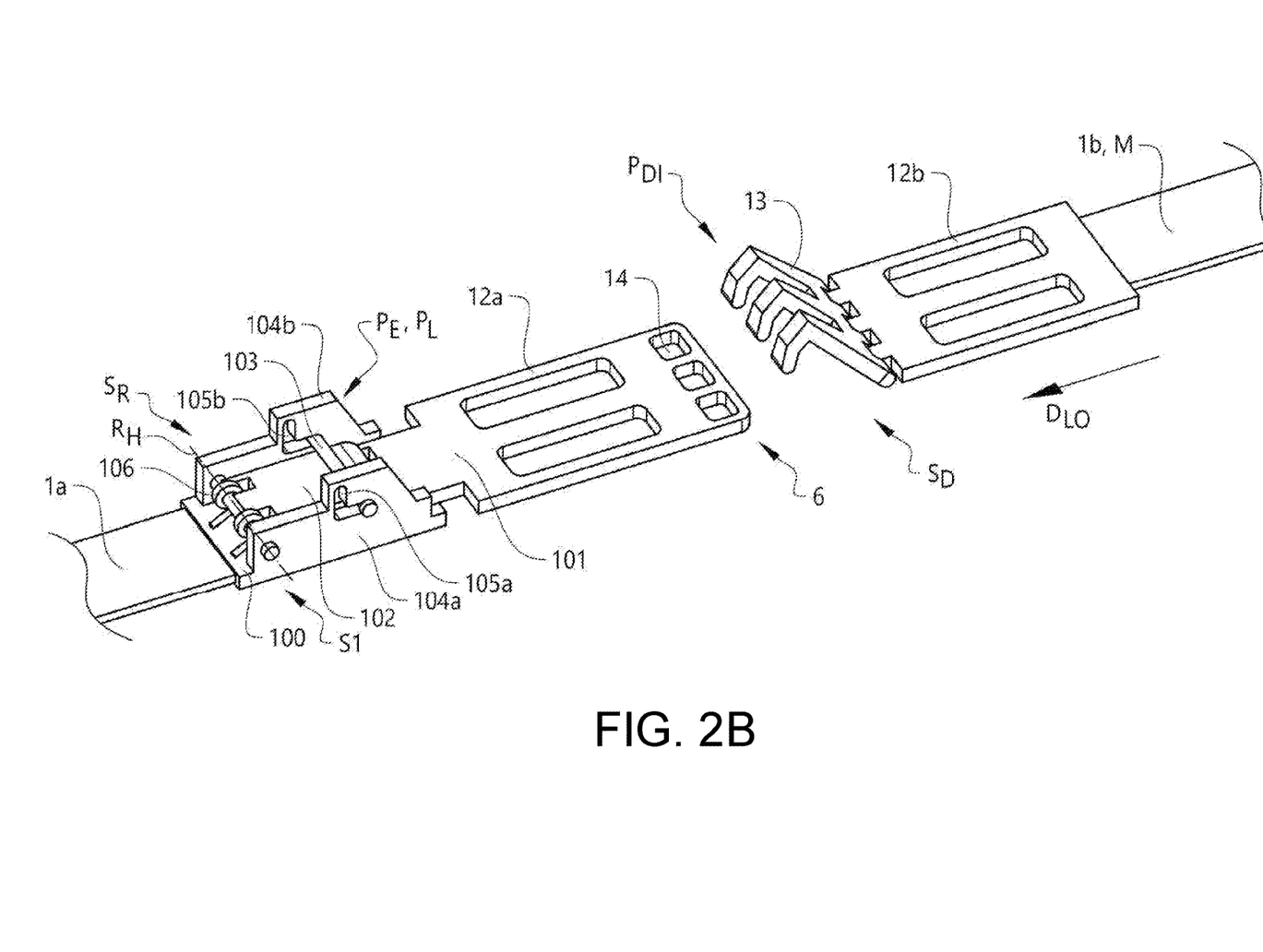
Figure 2C:
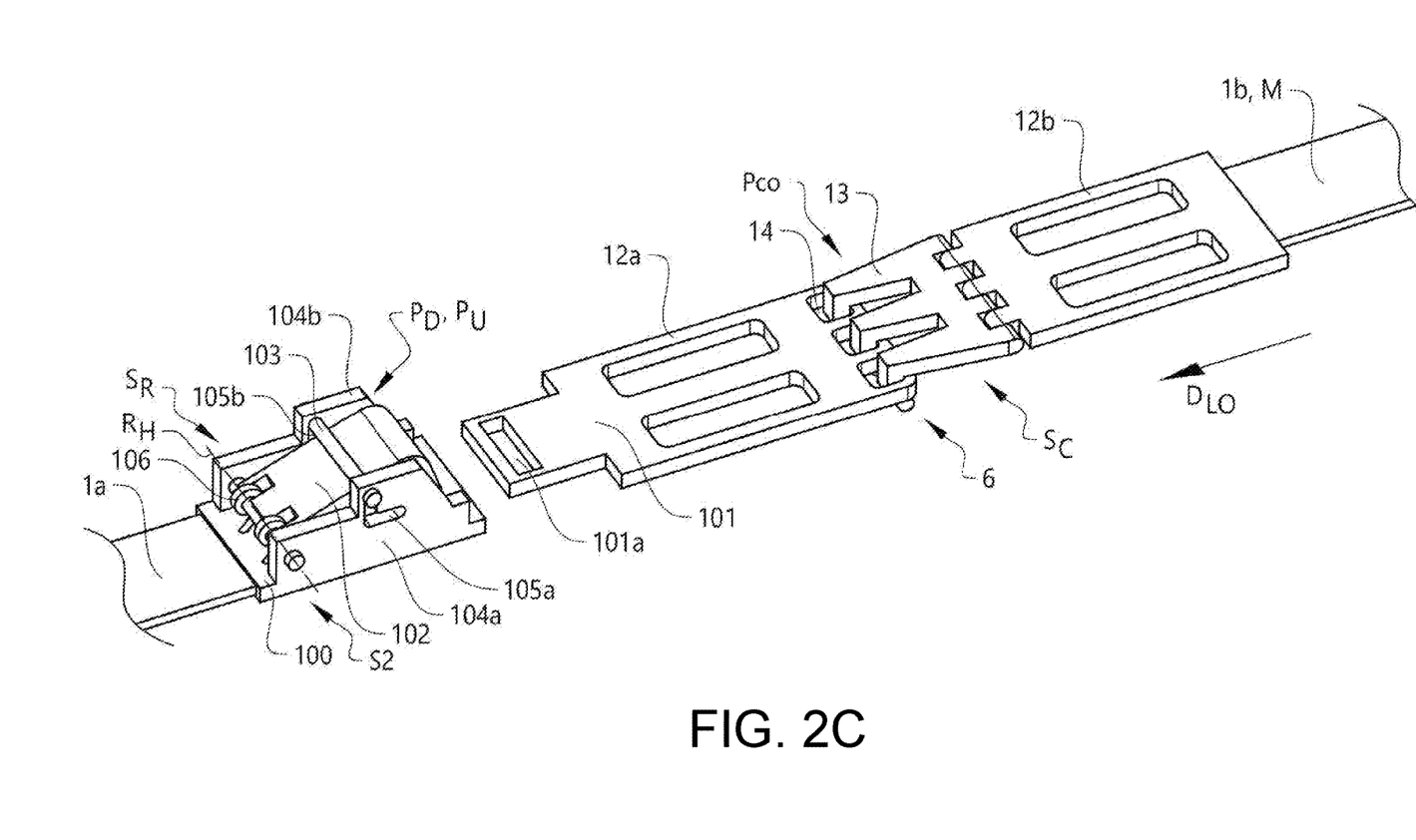
Figure 3A:
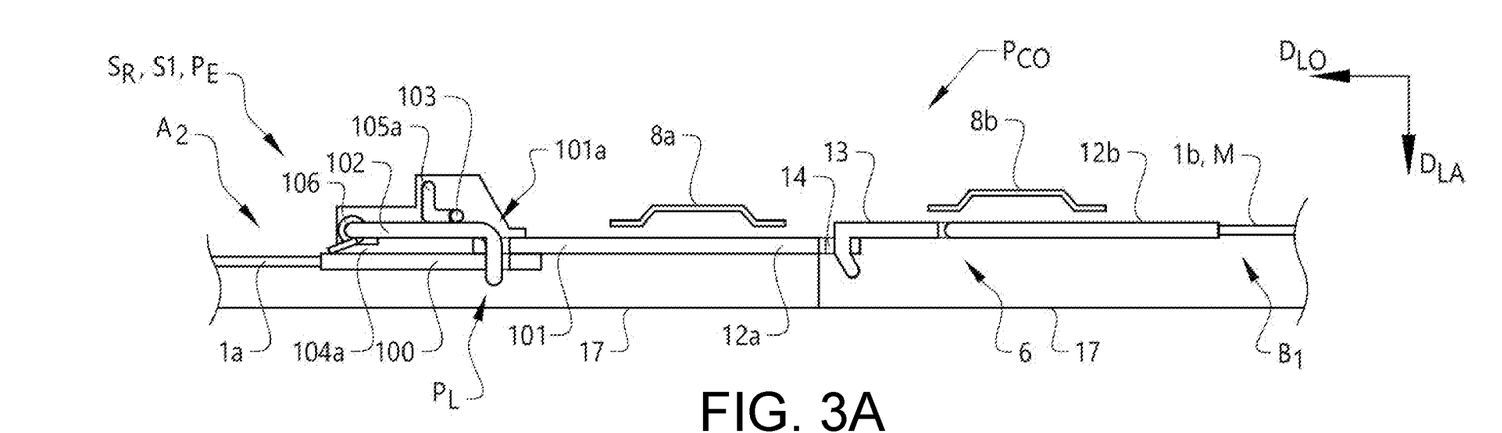
FIGS. 3A-3B show schematically, in a view from above and in a side view, the safety release system in a locked and engaged position, according to the disclosure.

As illustrated in FIGS. 2A-2B, 3A-3B and 4A-4B, the connecting device 6 comprises a first connector part 12a connected to the first side safety structure 1a via the safety release system $S_R$. The connecting device further comprises a second connector part 12b connected to the second side safety structure 1b. The first connector part 12a and the second connector part 12b are configured for releasably connecting the first side safety structure 1a and the second side safety structure 1b to each other. The connecting device 6 is configured for being arranged in a connected state $S_C$ where the first connector part 12a and the second connector part 12b are connected to each other, as shown in FIGS. 2A and 2C, and a disconnected state $S_D$ where the first connector part 12a and the second connector part 12b are disconnected from each other, as shown in FIG. 2B. The connected state $S_C$ is used when the side doors are arranged in the closed door position $P_C$ for a secure connection between the first side safety structure 1a and the second side safety structure 1b. The disconnected state $S_D$ is allowing opening of the first side door 4a and/or the second side door 4b. The control unit may be used for controlling the states of the connecting device 6. In the illustrated embodiment, the first connector part 12a comprises hook openings 14, and the second connector part 12b comprises a hook 13. The hook 13 is in engagement with the hook openings 14 in the connected state $S_C$, as shown in FIG. 2A, and configured for being disengaged from the hook openings 14 in the disconnected state $S_D$, as shown in FIG. 2B. In the connected state $S_C$, the first side safety structure 1a and the second side safety structure are securely connected to each other through the interaction between the hook 13 and the hook openings 14. The hook 13 is configured for pivoting between a connected position $P_{CO}$ in the connected state $S_C$ and a disconnected position $P_{DI}$ in the disconnected state $S_D$, as shown in FIGS. 2A-2B, and the hook 13 may for example be pivotably connected to the second connector part 12b via a hinged member, a pivot axis or other suitable pivoting mechanism. The pivoting movement between the connected position $P_{CO}$ and the disconnected position $P_{DI}$ may be achieved with for example a suitable actuating mechanism or an actuating mechanism together with a spring arrangement. A suitable actuator is for example an electric motor, a solenoid-type actuator, or other suitable linear or rotary actuators. In an alternative non-illustrated embodiment, the first connector part 12a may instead comprise the hook 13 and the second connector part 12b the hook openings 14.

The first side safety structure 1a is connected to the connecting device 6 via the safety release system $S_R$. The safety release system $S_R$ is arranged between the first side safety structure 1a and the connecting device 6, and the connecting device 6 is configured for releasably attaching the first side safety structure 1a to a side impact restraint protection system member M connected to a vehicle body structure 3, such as the second side safety structure 1b described above.

The safety release system $S_R$ is arranged between the first side safety structure 1a and the connecting device 6, and the safety release system $S_R$ is configured for releasing the connection between the first side safety structure 1a and the connecting device 6 of the side impact restraint protection system S after the vehicle impact event. After such an impact event, it may due to vehicle deformation be impossible to disconnect the connecting device 6 for opening the vehicle side door or side doors, and then the safety release system $S_R$ is instead used for disconnecting the first side door 4a, or alternatively the first side door 4a from the second side door 4b as shown in the illustrated embodiments. The safety release system $S_R$ is thus arranged for releasing the connection between the first side safety structure 1a and the connecting device 6 after a vehicle impact event. As described above, the first side safety structure 1a is arranged in connection to the first side door 4a of the vehicle V, and the safety release system $S_R$ is configured for enabling opening of the first side door 4a, or depending on the vehicle construction alternatively the first side door 4a and/or the second side door 4b, after the vehicle impact event. In an alternative non-illustrated embodiment, the safety release system $S_R$ is instead arranged between the second side safety structure 1b and the connecting device 6, and the safety release system $S_R$ is configured for releasing the connection between the second side safety structure 1b and the connecting device 6 of the side impact restraint protection system S after the vehicle impact event.

In the illustrated embodiments, the side impact restraint protection system member M is configured as the second side safety structure 1b arranged in connection to the second side door 4b of the vehicle V. The safety release system $S_R$ is in the illustrated embodiments enabling opening of the first side door 4a and/or the second vehicle door 4b after the vehicle impact event.

As described above, the safety release system $S_R$ comprises the releasing mechanism 100 and the releasing member 101 detachably arranged in relation to each other. In the illustrated embodiment, the releasing mechanism 100 is attached to the first side safety structure 1a, and the releasing member 101 is connected to the connecting device 6. The safety release system $S_R$ is configured for being arranged in a first state S1 where the releasing mechanism 100 and the releasing member 101 are connected to each other, as shown in FIGS. 2A and 3A-3B, and a second state S2 where the releasing mechanism 100 and the releasing member 101 are disconnected from each other, as shown in FIGS. 2C and 4A-4B.

The releasing mechanism 100 comprises a hook member 102 and the releasing member 101 comprises a hook receiving opening 101a. The hook member 102 is configured for being engaged with the hook receiving opening 101a in the first state S1 and configured for being disengaged from the hook receiving opening 101a in the second state S2. The hook member 102 is configured for pivoting from an engaged position $P_E$ in the first state S1, as illustrated in FIGS. 2A and 3A-3B, to a disengaged position $P_D$ in the second state S2, as illustrated in FIGS. 2C and 4A-4B.

As shown in the illustrated embodiments, the hook member 102 is pivotally displaceable by one or more springs 106. The hook member 102 is pre-tensioned with the springs 106 in the first state S1, and the springs 106 are displacing the hook member 102 from the engaged position $P_E$ to the disengaged position $P_D$ in the second state S2. The springs 106 may have any suitable configuration, such as for example torsion springs or other suitable spring mechanisms. The releasing mechanism 100 further comprises a safety pin 103, which is preventing displacement of the hook member 102 from the engaged position $P_E$ to the disengaged position $P_D$ in the first state S1. In the second state S2, the safety pin 103 is allowing displacement of the hook member 102 from the engaged position $P_E$ to the disengaged position $P_D$.

Figure 3B:
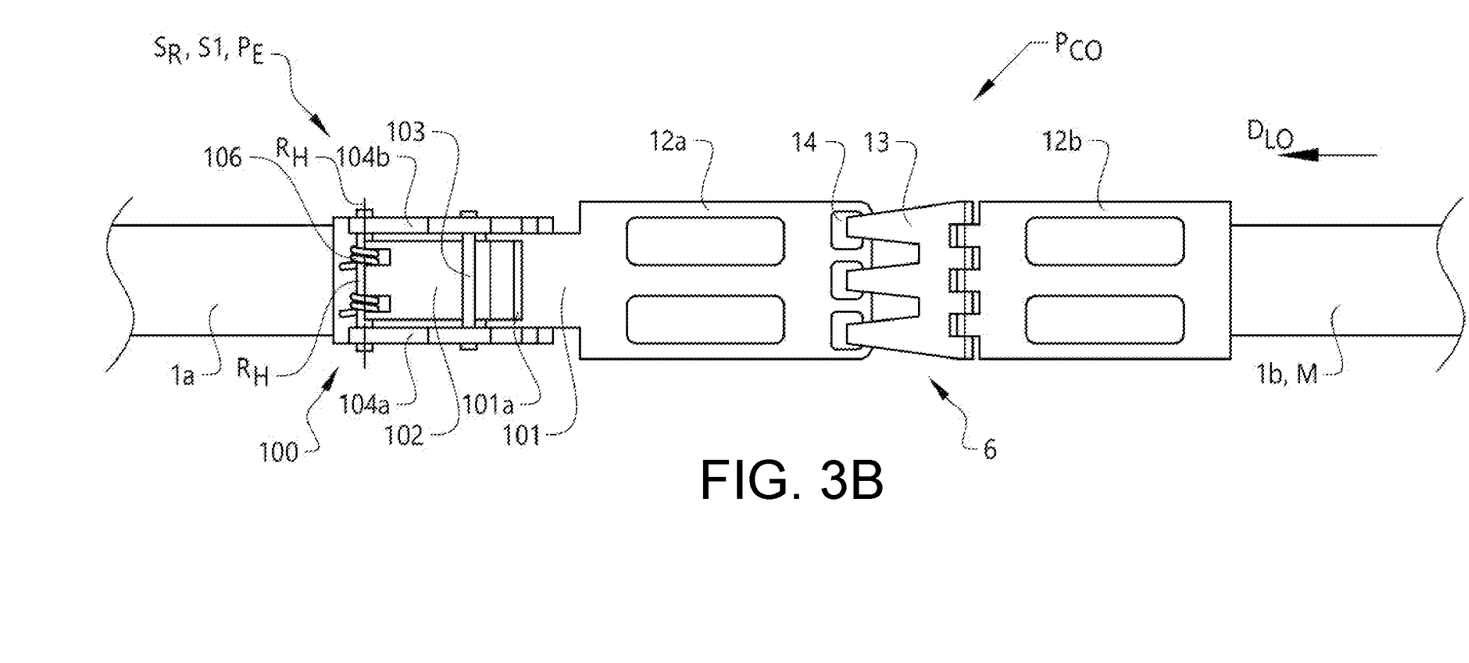
Figure 4A:
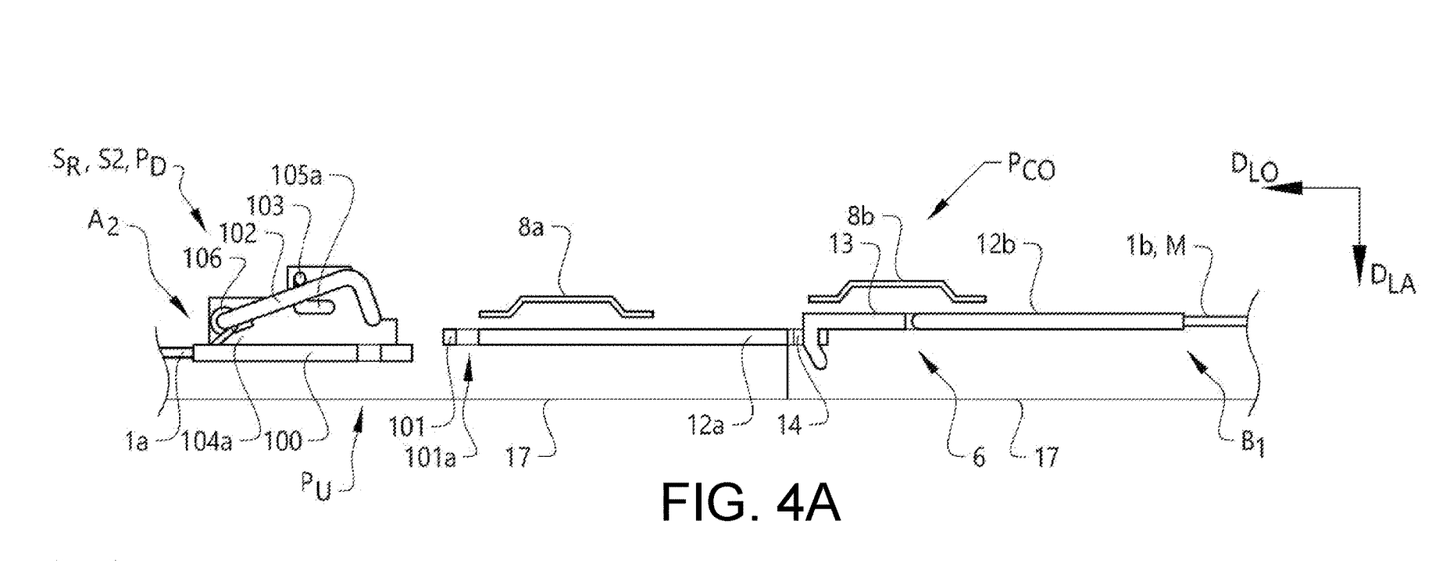
FIGS. 4A-4B show schematically, in a view from above and in a side view, the safety release system in an unlocked and disengaged position, according to the disclosure.
Figure 4B:
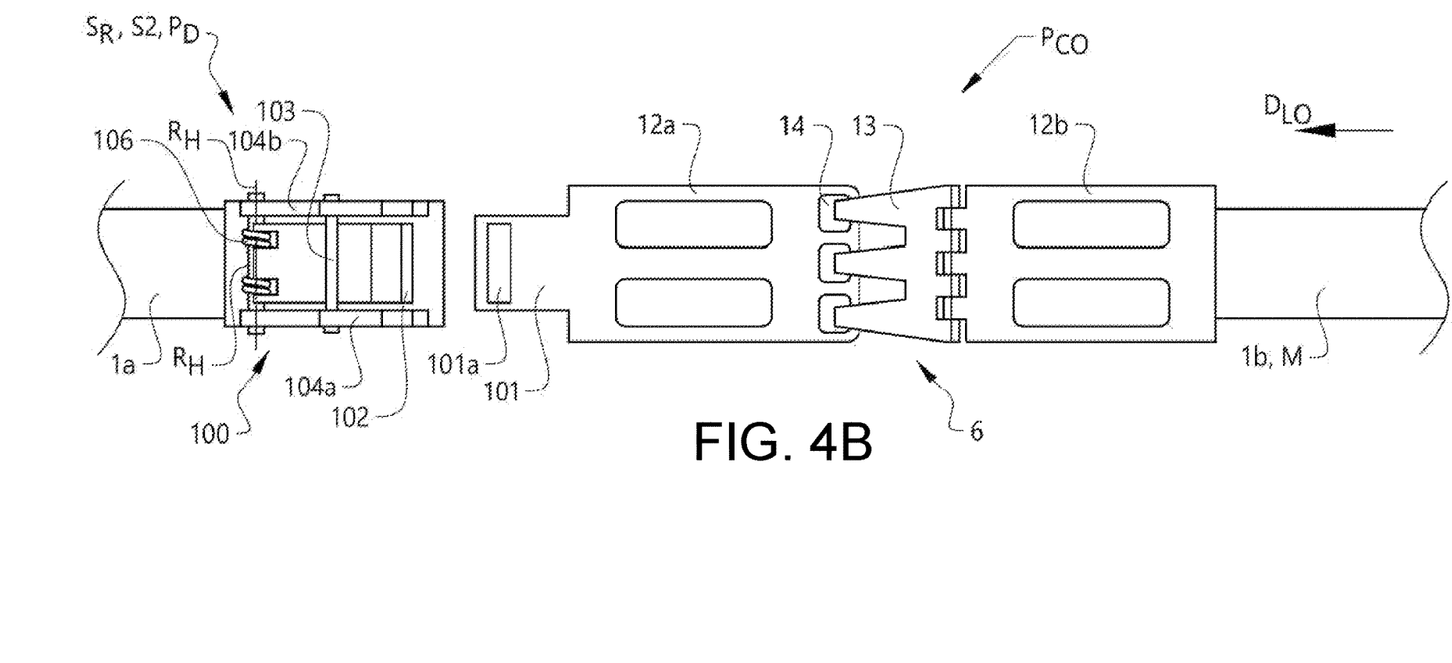

The releasing mechanism 100 comprises a first wall structure 104a and a second wall structure 104b, as schematically illustrated in FIGS. 2A-2C, 3A-3B, and 4A-4B. The hook member 102 is pivotally connected to and extending between the first wall structure 104a and the second wall structure 104b, and the hook member 102 is arranged to pivot around a hook rotational axis $R_H$ when the safety release system $S_R$ is displaced from the first state S1 to the second state S2. The pivoting arrangement of the hook member 102 may for example be accomplished with a shaft extending between the first wall structure 104a and the second wall structure 104b, where the hook member 102 is rotatably attached to the shaft, or alternatively where the shaft is rotatably arranged in relation to the wall structures, allowing a pivoting movement of the hook member 102. In the first state S1, the hook member 102 is in engagement with the hook receiving opening 101a in the engaged position $P_E$, as shown in FIGS. 2A and 3A-3B. In the second state S2, the hook member is disengaged from the hook receiving opening 101a in the disengaged position $P_D$, as shown in FIGS. 2C and 4A-4B.

The first wall structure 104a comprises a first safety pin track 105a and the second wall structure 104b comprises a second safety pin track 105b. The safety pin 103 is movably connected to and extending between the first wall structure 104a and the second wall structure 104b. The safety pin 103 is configured to move in relation to the first wall structure 104a in the first safety pin track 105a and in relation to the second wall structure 104b in the second safety pin track 105b from a locked position $P_L$ in the first state S1 where the safety pin 103 is blocking movement of the hook member 102, as shown in FIGS. 2A and 3A-3B, to an unlocked position $P_U$ in the second state S2 where the safety pin 103 is allowing movement of the hook member 102 from the engaged position $P_E$ to the disengaged position $P_D$, as shown in FIGS. 2C and 3A-3B.

The releasing mechanism comprises an actuating unit 107 connected to the safety pin 103, as schematically indicated in FIG. 2A. The actuating unit 107 is configured for displacing the safety pin 103 from the locked position $P_L$ in the first state S1 to the unlocked position $P_U$ in the second state S2. The actuating unit 107 may for example be a mechanical actuator, where a wire structure in one end is connected to the safety pin 103 and in the other end to an actuating handle. When moving the actuating handle, the safety pin 103 is displaced from the locked position $P_L$ to the unlocked position $P_U$. In this way, the actuating handle is used for changing the state of the safety release system $S_R$, from the first state S1 to the second state S2. When moving the actuating handle, the safety pin 103 is moved from the locked position $P_L$ to the unlocked position $P_U$, and in the unlocked position $P_U$ the hook member 102 is displaced from the engaged position $P_E$ to the disengaged position $P_D$ by the springs 106. The actuating handle may be arranged on the vehicle for easy access from inside the vehicle and outside the vehicle. The actuating unit may alternatively comprise two actuating handles connected to the safety pin 103, one arranged inside the passenger compartment of the vehicle V and one in connection to an external surface of the vehicle V.

In an alternative non-illustrated embodiment, instead of the spring arrangement the hook member 102 may be pivotally displaceable by an electric motor, where the electric motor upon activation by the vehicle control unit is configured for displacing the hook member 102 from the engaged position $P_E$ in the first state S1 to the disengaged position $P_D$ in the second state S2. In a further alternative non-illustrated embodiment, the actuating unit 107 may alternatively be arranged as an electric actuator, for displacing the safety pin 103, upon initiation by a user via for example an electric switch arrangement connected to the actuating unit 107 or remotely controlled via a mobile phone app. The vehicle control unit is suitably connected to the electric actuator for controlling the system. The electric actuator may for example be a solenoid or other type of linear or rotary actuator used for displacing the safety pin 103 from the locked position $P_L$ to the unlocked position $P_U$. If using an electric motor for displacing the hook member 102, the safety pin 103 may be omitted if suitable, and the electric motor can be activated upon initiation by a user via for example an electric switch arrangement connected to the electric motor.

In the embodiment illustrated in FIG. 1B, the side impact restraint protection system S comprises a first pair P1 of the first side safety structure 1a and the second side safety structure 1b, and a second pair P2 of the first side safety structure 1a and the second side safety structure 1b, arranged in the first side door 4a and the second side door 4b respectively. Each pair is similar in construction to the system described above in connection to FIG. 1A, where each pair is provided with a safety release system $S_R$ having the same functionality and components.

In the embodiment illustrated in FIG. 1C, the side impact restraint protection system S comprises the first side safety structure 1a and the second side safety structure 1b arranged as membrane structures, as described above. This embodiment is similar in construction to the system described above in connection to FIG. 1A, but with two safety release systems $S_R$ having the same functionality and components.

The safety release system $S_R$ is operated after a vehicle impact event when the connecting device 6 is damaged or prevented from being displaced from the connected position $P_{CO}$ to the disconnected position $P_{DI}$, for example if a deformation of the vehicle body structure 3 and/or of one or more side doors prevents normal operation of the connecting device 6 for opening the vehicle side doors. If a vehicle impact event has occurred, and the side doors of the vehicle V cannot be opened or only partly opened due to malfunctioning or damaged components, the safety release system $S_R$ may be operated by an occupant or user of the vehicle V or by other persons in connection to the vehicle V, such as for example rescue personnel. The vehicle control unit may be used for detecting malfunctioning or damaged components, or alternatively manually detected by a person trying to open the side doors with the door opening mechanism.

To operate the safety release system $S_R$ of the vehicle V, the safety release system $S_R$ is arranged in a second state S2 after the vehicle impact event. In the second state S2, the releasing mechanism 100 and the releasing member 101 are disconnected from each other for releasing the connection between the first side safety structure 1a and the connecting device 6, which is enabling opening of the first side door 4a and the second side door 4b. In order to release the connection, the safety pin 103 is moved from the locked position $P_L$ to the unlocked position $P_U$ in the second state S2, allowing movement of the hook member 102 from the engaged position $P_E$ to the disengaged position $P_D$. The safety pin 103 is as described above displaced with the actuating unit 107 from the locked position $P_L$ to the unlocked position $P_U$. After movement of the safety pin 103 to the unlocked position $P_U$, the hook member 102 is released from the hook receiving opening 101a in the second state S2. The hook member 102 is pivoted from the engaged position $P_E$ in the first state S1 to the disengaged position $P_D$ in the second state S2, where the one or more springs 106 are displacing the hook member 102 from the engaged position $P_E$ to the disengaged position $P_D$ in the second state S2, pivoting the hook member 102 from an engaged position $P_E$ in the first state S1 to a disengaged position $P_D$ in the second state S2. In the disengaged position, the releasing member 101 is allowed to slide away from the hook member 102 when opening the first side door 4a and/or the second side door 4b. Alternatively, the electric motor is displacing the hook member 102 from the engaged position $P_E$ to the disengaged position $P_D$ in the second state S2, as described above.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the control unit or other parts of the side impact restraint protection system or the safety release system, the one or more programs comprising instructions for performing the method according to any one of the above-discussed embodiments. Moreover, the processor may be connected to one or more communication interfaces and/or sensor interfaces for receiving and/transmitting data with external entities such as e.g. sensors arranged on the vehicle surface, an off-site server, or a cloud-based server.

The processor or processors associated with the control unit or other parts of the vehicle side impact restraint protection system S, or the safety release system $S_R$ may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1a First side safety structure
1b Second side safety structure
2a First structural element
2b Second structural element
3 Vehicle body structure
4a First side door
4b Second side door
5 Door opening
6 Connecting device
7a First connection member
7b Second connection member
8a First door beam
8b Second door beam
9 Roof beam structure
10 Sill structure
11a Rear edge, First side door
11b Front edge, Second side door
12a First connector part
12b Second connector part
13 Hook
14 Hook opening
17 Outer door panel
18a First hook structure
18b First opening structure
19a Second hook structure
19b Second opening structure
100 Releasing mechanism
101 Releasing member
101a Hook receiving opening
102 Hook member
103 Safety pin
104a First wall structure
104b Second wall structure
105a First safety pin track
105b Second safety pin track
106 Spring
107 Actuating unit
$A_1$ First end, First side safety structure
$A_2$ Second end, First side safety structure
$B_1$ First end, Second side safety structure
$B_2$ Second end, Second side safety structure
$D_{LA}$ Lateral direction
$D_{LO}$ Longitudinal direction
M Side impact restraint protection system member
$R_H$ Hook rotational axis
$P_C$ Closed door position
$P_{CO}$ Connected position
$P_D$ Disengaged position
$P_{DI}$ Disconnected position
$P_E$ Engaged position
$P_L$ Locked position
$P_U$ Unlocked position
S Vehicle side impact restraint protection system
S1 First state
S2 Second state
$S_C$ Connected state
$S_D$ Disconnected state
$S_R$ Safety release system

What is claimed is:

1. A safety release system for releasing a connection between a first side safety structure and a connecting device of a side impact restraint protection system for a vehicle after a vehicle impact event, wherein the first side safety structure is arranged in connection to a first side door of the vehicle, and wherein the safety release system is configured for enabling opening of the first side door after the vehicle impact event,
wherein the safety release system is arranged between the first side safety structure and the connecting device, wherein the connecting device is configured for releasably attaching the first side safety structure to a side impact restraint protection system member connected to a vehicle body structure,
wherein the safety release system comprises a releasing mechanism and a releasing member detachable from each other, wherein the safety release system is configured for being arranged in a first state where the releasing mechanism and the releasing member are connected to each other and a second state where the releasing mechanism and the releasing member are disconnected from each other.

2. The safety release system according to claim 1, wherein the releasing mechanism comprises a hook member and the releasing member comprises a hook receiving opening, wherein the hook member is configured for being engaged with the hook receiving opening in the first state and configured for being disengaged from the hook receiving opening in the second state.

3. The safety release system according to claim 2, wherein the hook member is configured for pivoting from an engaged position in the first state to a disengaged position in the second state.

4. The safety release system according to claim 3, wherein the hook member is pivotally displaceable by one or more springs, wherein the hook member is pre-tensioned with the one or more springs in the first state, and wherein the one or more springs are configured for displacing the hook member from the engaged position to the disengaged position in the second state,
or wherein the hook member is pivotally displaceable by an electric motor, wherein the electric motor is configured for displacing the hook member from the engaged position to the disengaged position in the second state.

5. The safety release system according to claim 4, wherein the releasing mechanism comprises a safety pin configured for preventing displacement of the hook member from the engaged position to the disengaged position in the first state, and wherein the safety pin is configured for allowing displacement of the hook member from the engaged position to the disengaged position in the second state.

6. The safety release system according to claim 2, wherein the releasing mechanism comprises a first wall structure and a second wall structure, wherein the hook member is pivotally connected to and extending between the first wall structure and the second wall structure, wherein the hook member is configured to pivot around a hook rotational axis when the safety release system is displaced from the first state to the second state.

7. The safety release system according to claim 5,
wherein the releasing mechanism comprises a first wall structure and a second wall structure;
wherein the first wall structure comprises a first safety pin track and the second wall structure comprises a second safety pin track, wherein the safety pin is movably connected to and extending between the first wall structure and the second wall structure, wherein the safety pin is configured to move in relation to the first wall structure in the first safety pin track and in relation to the second wall structure in the second safety pin track from a locked position in the first state where the safety pin is blocking movement of the hook member to an unlocked position in the second state where the safety pin is allowing movement of the hook member from the engaged position to the disengaged position; and
wherein the hook member is pivotally connected to and extending between the first wall structure and the second wall structure, wherein the hook member is configured to pivot around a hook rotational axis when the safety release system is displaced from the first state to the second state.

8. The safety release system according to claim 7, wherein the releasing mechanism comprises an actuating unit connected to the safety pin, wherein the actuating unit is configured for displacing the safety pin from the locked position to the unlocked position in the second state.

9. The safety release system according to claim 1, wherein the side impact restraint protection system member is a second side safety structure arranged in connection to a second side door of the vehicle, wherein the safety release system is configured for enabling opening of the first side door and/or the second vehicle door after the vehicle impact event.

10. The safety release system according to claim 9, wherein the first side safety structure in a first end is releasably connected to a first connection member of the vehicle body structure and in a second end connected to the connecting device via the safety release system, and wherein the second side safety structure in a first end is connected to the connecting device and in a second end releasably connected to a second connection member of the vehicle body structure.

11. The safety release system according to claim 10, wherein the first connection member is arranged in connection to an A-pillar of the vehicle body structure, and the second connection member is arranged in connection to a C-pillar of the vehicle body structure.

12. A side impact restraint protection system for a vehicle, wherein the side impact restraint system comprises a safety release system according to claim 1.

13. A method for operating a safety release system of a vehicle, wherein a first side safety structure of a side impact restraint protection system is arranged in connection to a first side door of the vehicle, wherein the safety release system is arranged between the first side safety structure and a connecting device, wherein the connecting device is releasably attaching the first side safety structure to a side impact restraint system protection member connected to a vehicle body structure, wherein the safety release system comprises a releasing mechanism and a releasing member detachable from each other, wherein the safety release system during normal operation of the vehicle is arranged in a first state where the releasing mechanism and the releasing member are connected to each other, wherein the method comprises the steps:

arranging the safety release system in a second state after a vehicle impact event, wherein in the second state the releasing mechanism and the releasing member are disconnected from each other for releasing the connection between the first side safety structure and the connecting device, enabling opening of the first side door.

14. The method according to claim 13, wherein the releasing mechanism comprises a hook member and the releasing member comprises a hook receiving opening, wherein the hook member is engaged with the hook receiving opening in the first state, wherein the method further comprises the step: disengaging the hook member from the hook receiving opening in the second state.

15. The method according to claim 14, wherein the hook member is pivotally displaceable by one or more springs, wherein the hook member is pre-tensioned with the one or more springs in the first state, wherein the method further comprises the steps: pivoting the hook member from an engaged position in the first state to a disengaged position in the second state, wherein the one or more springs are displacing the hook member from the engaged position to the disengaged position in the second state;

or wherein the hook member is pivotally displaceable by an electric motor, wherein the method further comprises the steps: pivoting the hook member from an engaged position in the first state to a disengaged position in the second state, wherein the electric motor is displacing the hook member from the engaged position to the disengaged position in the second state.

16. The method according to claim 15, wherein the releasing mechanism comprises a safety pin preventing displacement of the hook member from the engaged position to the disengaged position in the first state and allowing displacement of the hook member from the engaged position to the disengaged position in the second state, wherein the safety pin is arranged in a locked position in the first state for blocking movement of the hook member, wherein the method further comprises the steps: moving the safety pin from the locked position to an unlocked position in the second state for allowing movement of the hook member from the engaged position to the disengaged position.

17. The method according to claim 16, wherein the releasing mechanism comprises an actuating unit connected to the safety pin, wherein the method further comprises the steps: displacing the safety pin with the actuating unit from the locked position to the unlocked position in the second state.

* * * * *